United States Patent

Takemoto et al.

[11] Patent Number: 5,849,660
[45] Date of Patent: Dec. 15, 1998

[54] CATALYST FOR PURIFYING EXHAUST GAS

[75] Inventors: Takashi Takemoto, Higashihiroshima; Kazunari Komatsu, Mihara; Taeko Shimizu, Hiroshima; Hiroshi Yamada, Hatsukaichi; Hiroshi Murakami, Hiroshima; Masayuki Koishi, Kure; Yuki Koda, Hiroshima; Keiko Matsui, Aki-gun, all of Japan

[73] Assignee: Mazda Motor Corporation, Hiroshima-ken, Japan

[21] Appl. No.: 605,499

[22] Filed: Feb. 26, 1996

[30] Foreign Application Priority Data

Feb. 24, 1995 [JP] Japan .................................. 7-036642

[51] Int. Cl.⁶ .............................. B01J 23/44; B01J 23/46; B01J 23/75
[52] U.S. Cl. ............................ 502/327; 502/304; 502/326
[58] Field of Search .................................. 502/326, 327, 502/349, 304

[56] References Cited

U.S. PATENT DOCUMENTS

| | | | |
|---|---|---|---|
| 4,006,103 | 2/1977 | Meguerian et al. | 252/438 |
| 4,239,656 | 12/1980 | Fujitani et al. | 252/462 |
| 4,492,769 | 1/1985 | Blanchard et al. | 502/262 |

FOREIGN PATENT DOCUMENTS 59-127649  7/1984  Japan .

*Primary Examiner*—Michael L. Lewis
*Assistant Examiner*—Alexander G. Ghyka
*Attorney, Agent, or Firm*—Morrison & Foerster LLP

[57] ABSTRACT

A catalyst (3) for purifying an automotive exhaust gas, in which inner and outer catalytic layers (5,6), each of which has a base material and a catalytic material held by the base material, are stratified on a honeycomb-type carrier (4). In the catalyst (3), the inner catalytic layer (5) contains a palladium component as the catalytic component. Further the inner catalytic layer (5) contains a nickel oxide component for preventing poisoning of the palladium component. On the other hand, though the outer catalytic layer (6) contains a rhodium component as the catalytic component, it does not contain a palladium component nor a nickel oxide component.

22 Claims, 6 Drawing Sheets

CATALYST FOR PURIFYING EXHAUST GAS

FIELD OF THE INVENTION

The present invention relates to a catalyst for purifying an exhaust gas of an automobile engine or the like.

DESCRIPTION OF THE PRIOR ART

In general, in an exhaust system of an automobile engine or the like, there is provided an exhaust gas purifying apparatus using a catalyst for purifying an exhaust gas (an exhaust gas purifying catalyst), since there are contained various air pollutants such as HC (hydrocarbons), CO (carbon monoxide), NOx (nitrogen oxides) and the like in the exhaust gas. Thus, as one of the above-mentioned type of exhaust gas purifying catalysts, conventionally, there is widely used such a catalyst as to have a catalytic layer in which a catalytic material containing platinum and/or rhodium is held (supported) by a base material composed of alumina or the like, the catalytic layer being formed on a surface of a honeycomb-shaped carrier composed of cordierite or the like.

However, in the above-mentioned conventional exhaust gas purifying catalyst containing platinum and/or rhodium as catalytic components, there is such a disadvantage that the manufacturing cost of the catalyst is raised, since platinum or rhodium is very expensive. Thus, for example, in the Japanese patent laid-open publication No. 59-127649, there is proposed an exhaust gas purifying catalyst using palladium, which is much cheaper than platinum or rhodium, as a catalytic component. Hereupon, in the exhaust gas purifying catalyst disclosed in the Japanese patent laid-open publication No. 59-127649, an inner catalytic layer which comprises a catalytic material containing palladium, cerium and/or lanthanum is formed on a honeycomb-type carrier, and further on the inner catalytic layer, there is formed an outer catalytic layer which comprises a catalytic material containing rhodium, iron and/or nickel.

However, in the conventional exhaust gas purifying catalyst containing palladium as a catalytic component, which is disclosed in the Japanese patent laid-open publication No. 59-127649, there is such a problem that the palladium component is poisoned by catalyst poisons in the exhaust gas, particularly sulfuric components such as hydrogen sulfide ($H_2S$) or the like so as to be deteriorated in an early stage. For example, when the palladium component contacts to the hydrogen sulfide ($H_2S$) in the exhaust gas, the palladium component combines with the hydrogen sulfide so as to change to palladium sulfide (PdS) so that the catalytic activity of the catalyst is lowered.

SUMMARY OF THE INVENTION

The present invention has been developed to solve the above-mentioned conventional problems, and has an object of providing a catalyst for purifying an exhaust gas, which has a high purification ability for the exhaust gas, the catalyst being capable of preventing its early deterioration due to its poisoning by catalyst poisons in the exhaust gas.

Thus, according to an aspect of the present invention which is developed to achieve the above-mentioned object, there is provided a catalyst for purifying an exhaust gas which comprises a carrier and a plurality of catalytic layers formed on the carrier so as to coat the carrier, wherein an inner one of the catalytic layers which is disposed at an inner position as compared with an outermost one of the catalytic layers contains a palladium component as a catalytic material and a nickel oxide component. Hereupon, it is preferable that a particle diameter of the nickel oxide component (powder) in the catalytic layer containing the palladium component is from 0.5 to 12 $\mu$m. The above-mentioned exhaust gas purifying catalyst may be preferably used for purifying an automotive exhaust gas containing sulfuric components such as hydrogen sulfide, sulfur oxides or the like.

In the above-mentioned exhaust gas purifying catalyst, since the palladium component is contained in the catalytic layer which is disposed at the nearer position to the carrier (i.e. inner position in the catalyst) than the outermost catalytic layer, there is lowered such a frequency that the palladium component contacts with catalyst poisons in the exhaust gases, particularly sulfuric components (sulfur itself and/or sulfuric compounds) so that the poisoning of the palladium component is restrained. Further, in the catalytic layer comprising the palladium component, since the nickel oxide component exists around the palladium component so as to prevent the catalyst poisons from approaching the palladium component, the poisoning of the palladium component is further restrained. Moreover, since the nickel oxide component restrains a formation of hydrogen sulfide which has a particularly strong poisoning property against the palladium component, the poisoning of the palladium component is furthermore restrained thereby. Thus, the early deterioration of the exhaust gas purifying catalyst is prevented so that the exhaust gas purifying ability of the catalyst is highly improved.

In the above-mentioned exhaust gas purifying catalyst, the catalytic material in the outermost catalytic layer may contain a rhodium component and/or a platinum component. In general, when a palladium component and a rhodium component exist together in the same catalytic layer, the two components tend to be alloyed due to their sintering (interaction) so as to be deteriorated. However, in this case, since the palladium component and the rhodium component do not coexist in any one of the catalytic layers, the sintering as described above is not caused. In consequence, the exhaust gas purifying ability of the catalyst is further improved. Further, in general, when a nickel oxide or nickel component coexists with a rhodium or platinum component, the nickel oxide or nickel component tends to poison the rhodium or platinum component. Hereupon, the nickel component particularly tends to much strongly poison the rhodium or platinum component. By the way, the nickel oxide or nickel component hardly tends to poison the palladium component. Thus, in this case, since there is contained no nickel oxide component in the outermost catalytic layer containing the rhodium component and/or the platinum component, the poisoning of the catalytic component as described above is not caused.

Further, in each of the above-mentioned exhaust gas purifying catalysts according to the present invention, it is preferable that the base material in the catalytic layer containing the palladium component is composed of alumina. In particular, it is more preferable that the base material is composed of alumina impregnated with lanthanum. Alumina impregnated with lanthanum, namely a porous alumina material in which lanthanum is adhered on the surface thereof, particularly elevates the heat resisting property of the catalytic layer. Hereupon, the palladium component may be held (supported) by the nickel oxide component. In this case, since there exists a sufficient amount of nickel oxide component around the palladium component, the poisoning preventing operation is further improved so that the early deterioration of the exhaust gas purifying catalyst is more efficiently prevented.

Still further, in each of the above-mentioned exhaust gas purifying catalysts according to the present invention, it is preferable that a palladium content in the catalytic layer containing the palladium component is from 7 to 93 percent by weight relative to the nickel oxide component. In this case, since the poisoning preventing operation of the nickel oxide component becomes stronger, the poisoning of the palladium component due to the catalyst poisons is efficiently restrained so that the early deterioration of the exhaust gas purifying catalyst is efficiently prevented. Hereupon, it is more preferable that the palladium content is from 14 to 47 percent by weight relative to the nickel oxide component. In this case, the poisoning of the palladium component is more efficiently restrained so that the early deterioration of the exhaust gas purifying catalyst is further more efficiently prevented.

Moreover, in each of the above-mentioned exhaust gas purifying catalysts according to the present invention, it is preferable that the catalytic layer containing the palladium component contains a ceria component and a zirconia component. Particularly, it is more preferable that the ceria component and the zirconia component in the catalytic layer containing the palladium component are combined so as to form an oxide complex. In this case, since the catalytic activity of the palladium component is elevated by the ceria component in the catalytic layer containing the palladium component, the exhaust gas purifying ability of the catalyst is further improved. In addition, since the heat resisting property of each of the palladium component and the ceria component is improved by the zirconia component in the catalytic layer containing the palladium component, the durability of the catalyst is improved.

Further, in each of the above-mentioned exhaust gas purifying catalysts according to the present invention, the number of the catalytic layers may be fixed for two (i.e. minimum number) for the purpose of simplifying the manufacturing process of the catalyst so as to reduce the manufacturing cost of the catalyst. In this case, it is preferable that the base material in each of the both catalytic layers is composed of alumina. Hereupon, the base material composed of alumina may be preferably impregnated with lanthanum. In addition, it is more preferable that each of the both catalytic layers contains an oxide complex of ceria and zirconia.

BRIEF DESCRIPTION OF THE DRAWINGS

These and other objects, features and advantages of the present invention will become clear from the following description taken in conjunction with the preferred embodiment with reference to the accompanying drawings, and in which.

DETAILED DESCRIPTION OF THE PREFERRED EMBODIMENT

Hereinafter, preferred embodiments of the present invention will be concretely described with reference to the accompanying drawings.

Figure 2:
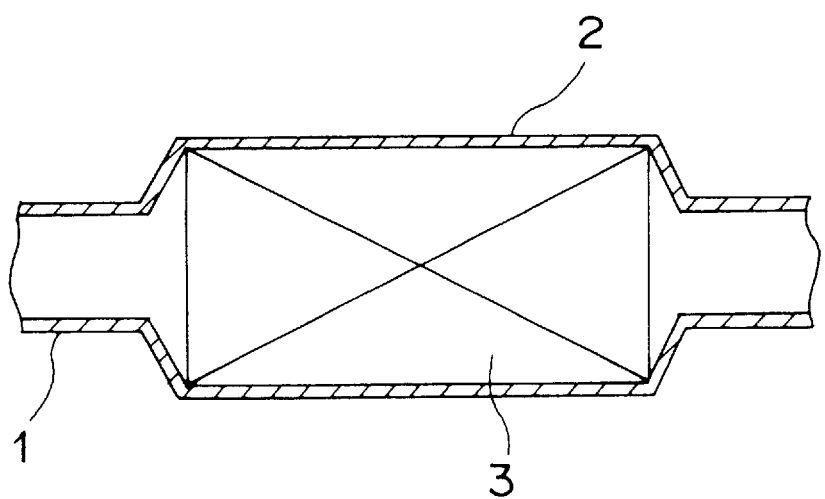
FIG. 2 is a longitudinal sectional view of an exhaust gas purifying apparatus using the exhaust gas purifying catalyst shown in FIG. 1.

As shown in FIG. 2, in an exhaust pipe 1 for discharging an exhaust gas of an automobile engine (not shown), there is interposed an exhaust gas purifying apparatus 2 (a catalytic converter), in which a catalyst 3 for purifying air pollutants contained in the exhaust gas, such as HC, CO, NOx and the like, is packed.

Figure 1:
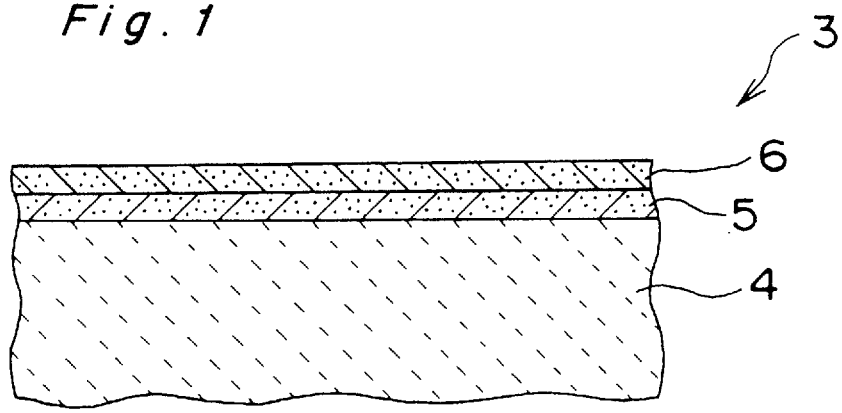
FIG. 1 is a longitudinal sectional view of an exhaust gas purifying catalyst according to the present invention.

As shown in FIG. 1, in the catalyst 3 for purifying the exhaust gas (exhaust gas purifying catalyst), an inner (lower) catalytic layer 5 is formed on a honeycomb-shaped carrier 4 composed of cordierite which is a carrier material with a good heat resisting property. Further, on the inner catalytic layer 5, an outer (upper) catalytic layer 6 is formed. Although the carrier 4 is composed of cordierite in the catalyst 3 according to the embodiment, it goes without saying that the material of the carrier 4 is not restricted to cordierite.

The inner catalytic layer 5 has such a fundamental construction that a palladium (Pd) component, which is a catalytic component, is held (supported) by a base material, the base material being composed of alumina impregnated with lanthanum. Hereupon, alumina impregnated with lanthanum, namely a porous alumina material in which lanthanum is adhered (fixed) on the surface thereof, particularly improves the heat resisting property of the inner catalytic layer 5.

Further, the inner catalytic layer 5 contains an oxide complex composed of ceria (cerium oxide) and zirconia (zirconium oxide), which functions as a promoter (OSC) for improving the exhaust gas purification ability or heat resisting property of the palladium component, an alumina boehmite component which functions as a binder for improving the mutual combining property among the components contained in the inner catalytic layer 5, and a nickel oxide component which is an additive agent for restraining the poisoning of the palladium component. Hereat, the zirconia in the inner catalytic layer 5 also has such a function as to improve the heat resisting property of the ceria. Hereupon, a nickel oxide powder is preferably used as the above-mentioned nickel oxide component so that the palladium component is held by the nickel oxide component in the inner catalytic layer 5, and then the nickel oxide component holding the palladium component and the alumina impregnated with lanthanum are mixed each other.

Hereupon, the base material in the inner catalytic layer 5 may be composed of alumina impregnated with lanthanum and zirconium instead of alumina impregnated with lanthanum. In this case, the heat resisting property of the inner catalytic layer 5 is further improved.

The outer catalytic layer 6 has such a fundamental construction that a rhodium (Rh) component is held by a base material, the base material being composed of alumina impregnated with lanthanum. Further, the outer catalytic layer 6 contains an oxide complex composed of ceria and zirconia which functions as a promoter for improving the exhaust gas purification ability or heat resisting property of the rhodium component, and an alumina boehmite component which functions as a binder for improving the mutual combining property among the components contained in the outer catalytic layer 6. In the outer catalytic layer 6, though any nickel oxide (or nickel) component must not be contained, a little palladium component may be contained. Further, the zirconia in the outer catalytic layer 6 also has such a function as to improve the heat resisting property of the ceria.

Hereupon, the base material in the outer catalytic layer 6 may be composed of alumina impregnated with lanthanum and zirconium instead of alumina impregnated with lanthanum. In this case, the heat resisting property of the outer catalytic layer 6 is further improved.

Hereinafter, a manufacturing method of a catalyst for purifying an automotive exhaust gas of the above-mentioned type will be described.

(1) At first, an oxide complex powder composed of ceria and zirconia (its average particle diameter ≈(nearly equal) 4 $\mu$m, Ce/Zr ratio=5/1), an alumina ($\gamma$-alumina) powder impregnated with lanthanum (or an alumina powder impregnated with lanthanum and zirconium) and a nickel oxide powder are mixed together at the ratio of 50/10/4 respectively so as to form a first mixture. Hereupon, the nickel oxide powder has been produced by heating a nickel powder strongly in the air. Then, the first mixture is induced to hold a palladium component so as to form a first intermediate material. Hereupon, the palladium content relative to the first mixture is adjusted to about 2.2 percent by weight.

(2) An alumina boehmite powder is added to the first intermediate material, and further a proper quantity of water is added to the first intermediate material so that a first slurry is formed. Then, the first slurry is applied on a honeycomb-type carrier so that a first wash-coat layer is formed on the honeycomb-shaped carrier. Hereupon, the alumina boehmite content relative to the first intermediate material is adjusted to 10 percent by weight.

(3) The honeycomb-shaped carrier with the first wash-coat layer is subjected to a drying process of 400° C. so that an inner catalytic layer is formed on the honeycombshaped carrier.

(4) Then, an oxide complex powder composed of ceria and zirconia (its average particle diameter ≈4$\mu$m, Ce/Zr ratio =5/1) and an alumina ($\gamma$-alumina) powder impregnated with lanthanum (or an alumina powder impregnated with lanthanum and zirconium) are mixed together at the ratio of 50/10 respectively so as to form a second mixture. Then, the second mixture is induced to hold a rhodium component so as to form a second intermediate material. Hereupon, the rhodium content relative to the second mixture is adjusted to about 0.2 percent by weight.

(5) An alumina boehmite powder is added to the second intermediate material, and further a proper quantity of water is added to the second intermediate material so that a second slurry is formed. Then, the second slurry is applied on the honeycomb-shaped carrier (inner catalytic layer) so that a second wash-coat layer is formed on the inner catalytic layer which has been already formed on the honeycomb-shaped carrier. Hereupon, the alumina boehmite content relative to the second intermediate material is adjusted to 10 percent by weight.

(6) The honeycomb-type carrier with the second washcoat layer is subjected to a drying process of 400° C. so that an outer catalytic layer is formed on the inner catalytic layer formed on the carrier. Thus, an exhaust gas purifying catalyst according to the present invention is completed.

In the exhaust gas purifying catalyst which is obtained in this manner, the palladium component is contained substantially only in the inner catalytic layer, while the rhodium component is contained only in the outer catalytic layer. The reason why each of the both component is induced to exist in the different catalytic layer is as follows.

Namely, the palladium component strongly tends to be poison by catalyst poisons in the exhaust gas, particularly sulfuric components such as hydrogen sulfide or the like so as to deteriorate its catalytic activity. However, when the palladium component is contained in the inner catalytic layer, there is lowered such a frequency that the palladium component contacts with the catalyst poisons in the exhaust gas so that the poisoning of the palladium component is restrained. More particularly speaking, the palladium component in the inner catalytic layer contacts with the exhaust gas which has passed through the outer catalytic layer, while the outer catalytic layer has such a operation as to prevent the catalyst poison from passing therethrough, in consequence, the concentration of the catalyst poisons in the exhaust gas which has reached to the inner catalytic layer after passing through the outer catalytic layer is lowered. Therefore, the palladium component is disposed only in the inner catalytic layer, while the rhodium component is disposed only in the outer catalytic layer. In addition, according to the abovementioned structure, since the combustible components such as HC, CO and the like in the exhaust gas easily pass through the outer catalytic layer so as to be effectively purified (oxidized or burnt) by the palladium component in the inner catalytic layer, the purification ratio of HC and CO is improved.

Further, in general, when a palladium component and a rhodium component exist together in the same exhaust gas purifying catalyst, the two components tend to be alloyed together due to their sintering (interaction) so as to be deteriorated. Thus, in the exhaust gas purifying catalyst, the sintering is prevented by disposing each of the palladium component and the rhodium component in the different catalytic layer so that the deterioration of the exhaust gas purifying catalyst is prevented.

Moreover, when the rhodium component is contained in the outer catalytic layer, the whole NOx purification efficiency of the exhaust gas purifying catalyst is improved. Therefore, the palladium component is disposed only in the inner catalytic layer, while the rhodium component is disposed only in the outer catalytic layer.

Still further, since the nickel oxide component is contained as well as the palladium component in the inner catalytic layer of the exhaust gas purifying catalyst, there are obtained such operations and effects as follows by the existence of the nickel oxide component.

Namely, since in the inner catalytic layer, the nickel oxide component exists around the palladium component so that the nickel oxide component prevents the catalyst poisons from approaching the palladium component, the poisoning of the palladium component is prevented. Further, the nickel oxide component restrains the formation of hydrogen sulfide which has a particularly strong poisonous character against the palladium component, whereby the poisoning of the palladium component is restrained.

Furthermore, since the palladium component is held by the powdery nickel oxide component, a sufficient amount of nickel oxide exists around the palladium component so that the poisoning preventing operation for the palladium component is further improved.

Thus, since the poisoning of the palladium component due to the catalyst poisons is restrained as described above, early deterioration of the exhaust gas purifying catalyst is prevented so that the purification ability of the catalyst is improved.

Hereupon, the reason why the additive agent in the inner catalytic layer is not nickel, but nickel oxide, is such that it is probable that nickel becomes a catalyst poison, namely the palladium component and the nickel component, each of which is an activator, combine each other so as to deteriorate the activity of the palladium component, while the nickel oxide component does not cause the disadvantage as described above.

Hereupon, it is preferable that the properties, the additive quantity and the like of the nickel oxide component which is added to the inner catalytic layer are set as follows.

(1) It is preferable that the particle diameter of the nickel oxide powder is in the range of 0.5 to 12 $\mu$m. If the particle diameter is smaller than the minimum value in the range, cohesion of the nickel oxide particle is caused when it is heated till higher temperature region. Further, if the particle diameter is larger than the maximum value in the range, the wash-coat process is aggravated.

(2) It is preferable that the purity of the nickel oxide powder is higher than 90 percent. If the purity is lower than that, the effect for restraining the poisoning due to sulfuric component is lowered so that such a probability that the deterioration of the palladium component near the nickel component is promoted becomes higher.

(3) It is preferable that the additive quantity of the nickel oxide powder is less than or equal to ten times of the quantity of the palladium component by weight, and is greater than or equal to the quantity of the palladium component by weight. In order to restrain adsorption of HC against the palladium component, it is necessary that the quantity of the nickel oxide component is greater than or equal to the quantity of the palladium component by weight. However, when such a nickel-rich state that the quantity of the nickel oxide component is greater than ten times of the quantity of the palladium component by weight, the exhaust gas purifying ability of the palladium component is restrained so that the exhaust gas purifying ability of the catalyst is aggravated. Therefore, the additive quantity of the nickel oxide powder is set within the above-mentioned range.

Figure 3:
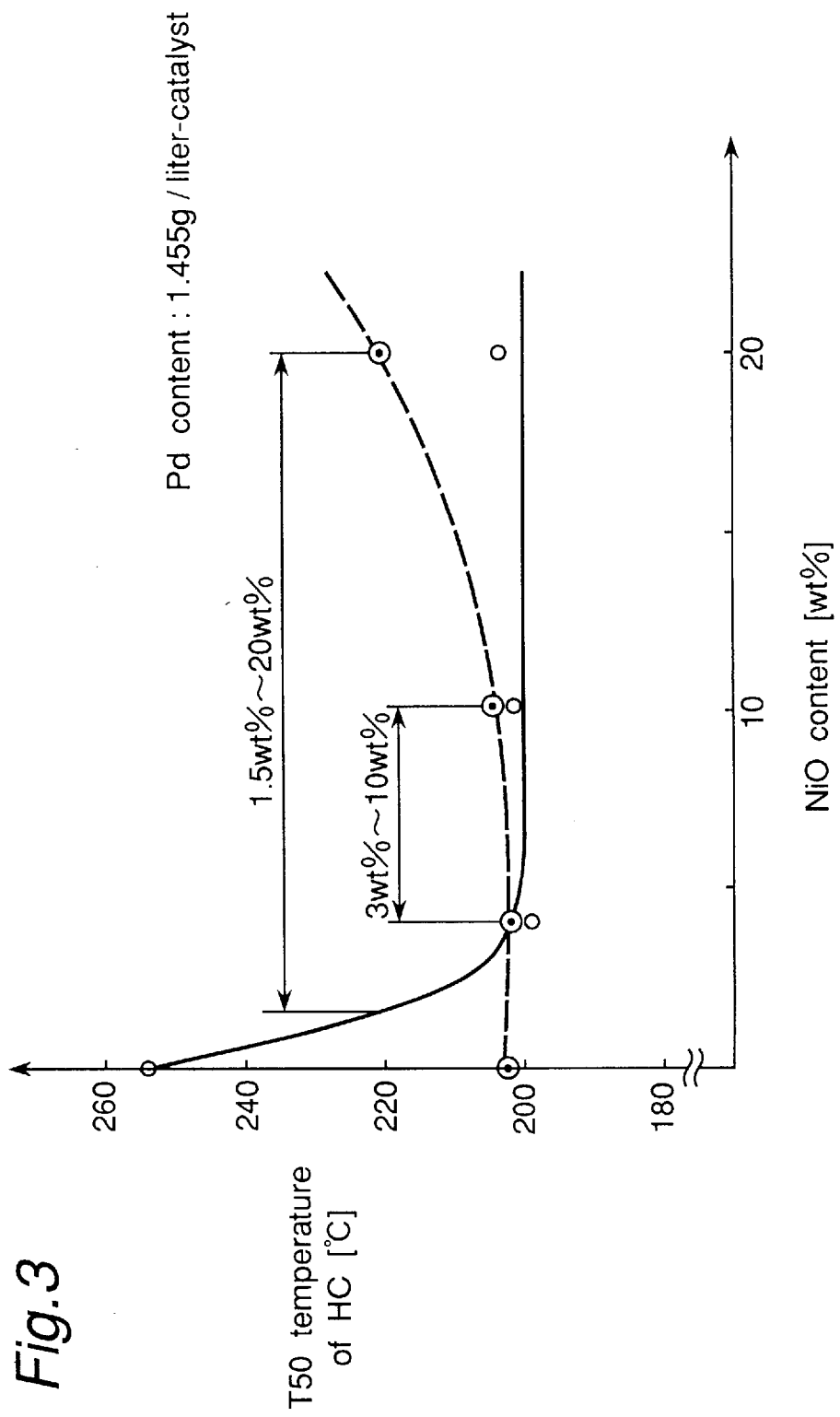
FIG. 3 is a diagram showing the relationship between T50 temperature of HC and NiO content by weight in a catalytic layer containing a palladium component of an exhaust gas purifying catalyst according to the present invention.

In FIG. 3, there is shown an experimental result obtained by measuring the exhaust gas purifying ability of each of various exhaust gas purifying catalysts, each of the catalysts having a different nickel oxide content. In the above, the nickel oxide content is the ratio (weight percent) of the nickel oxide component relative to the whole components of the catalyst. In the measurement, the palladium content was set to 1.455 g/liter-catalyst. Hereupon, the exhaust gas used for the measurement was a simulate gas containing $C_6H_6$, NOx, CO, $CO_2$, $O_2$, $N_2$, $H_2$, $H_2O$ and $SO_2$, in which the $SO_2$ concentration tration was 90 ppm. Further, in the measurement, the air-fuel ratio (A/F ratio) was set to 14.7±0.9 ($H_2O$:10 volume percent) and then the volume velocity (SV) of the exhaust gas was set to 60000 $hr^{-1}$.

In FIG. 3, the exhaust gas purifying ability is expressed as T50 temperature of HC. Hereupon, T50 temperature means such a temperature (°C.) of the inlet exhaust gas that the purifying ratio of the predetermined air pollutant (HC in FIG. 3) becomes 50 percent. Namely, T50 temperature is an index for evaluating the catalytic activity or exhaust gas purifying ability of the catalyst at lower temperature condition. Therefore, the lower T50 temperature of the catalyst becomes, the higher the catalytic activity or exhaust gas purifying ability of the catalyst at lower temperature condition becomes.

In FIG. 3, the broken line indicates the data of fresh catalysts, while the solid line indicates the data of aged catalysts.

It goes without saying that it is good that the exhaust gas purifying ability of the catalyst is as high as possible. However, as a practical criterion, it is preferable that T50 temperature of HC is approximately lower than or equal to 220° C., and further it is more preferable that T50 temperature is approximately lower than or equal to 200° C.

Thus, according to FIG. 3, it may be considered that the nickel oxide content which can bring T50 temperature of HC to a temperature lower than or equal to 220° C. is approximately from 1.5 to 20 percent by weight. In this case, the ratio of the palladium component relative to the nickel oxide component in the inner catalytic layer is approximately from 7 to 93 percent by weight. Therefore, in the inner catalytic layer of the exhaust gas purifying catalyst, it is preferable that the ratio of the palladium component relative to the nickel oxide component is set within the range from 7 to 93 percent by weight.

Further, according to FIG. 3, it may be considered that the nickel oxide content which can bring T50 temperature of HC to a temperature lower than or equal to 200° C. is approximately from 3 to 10 percent by weight. In this case, the ratio of the palladium component relative to the nickel oxide component in the inner catalytic layer is approximately from 14 to 47 percent by weight. Therefore, in the inner catalytic layer of the exhaust gas purifying catalyst, it is more preferable that the ratio of the palladium component relative to the nickel oxide component is set within the range from 14 to 47 percent by weight.

Hereinafter, there will be described experimental results obtained by measuring the exhaust gas purifying ability or anti-poisoning property of an exhaust gas purifying catalyst according to the present invention in comparison with those of a comparative example according to conventional techniques.

In Table 1, there are shown the properties, composition or characteristics of each of a catalyst M according to the present invention and a catalyst C which is a comparative example, each of the catalyst being used for the measurement. As apparent from Table 1, in the catalyst M, the nickel oxide component (powder) is disposed only in the inner catalytic layer, while in the catalyst C, the nickel oxide component (powder) is disposed only in the outer catalytic layer.

TABLE 1

| | Composition of Catalysts | | | |
|---|---|---|---|---|
| | Catalyst C (Comp. example) | | Catalyst M (Embodiment) | |
| Substances composing catalysts | Material | Content (g/L-cat) | Material | Content (g/L-cat) |
| (Outer layer) | | | | |
| Rhodium | Rh nitrate | 0.145 | Rh nitrate | 0.145 |

TABLE 1-continued

Composition of Catalysts

| Substances composing catalysts | Catalyst C (Comp. example) Material | Content (g/L-cat) | Catalyst M (Embodiment) Material | Content (g/L-cat) |
|---|---|---|---|---|
| Alumina | La—Al$_2$O$_3$ | 50 | La—Al$_2$O$_3$ | 50 |
| Nickel oxide | NiO powder | 4 | — | — |
| Ceria-zirconia oxide complex | CeO$_2$—ZrO$_2$ (Ce/Zr = 3/1) | 10 | CeO$_2$—ZrO$_2$ (Ce/Zr = 3/1) | 10 |
| Washcoat ratio target value (Inner Layer) | 15 wt. percent | | 15 wt. percent | |
| Palladium | Dinitro Pd | 1.455 | Dinitro Pd | 1.455 |
| Alumina | La—Al$_2$O$_3$ | 50 | La—Al$_2$O$_3$ | 50 |
| Nickel oxide | — | — | NiO powder | 4 |
| Ceria-zirconia oxide complex | CeO$_2$—ZrO$_2$ (Ce/Zr = 3/1) | 10 | CeO$_2$—ZrO$_2$ (Ce/Zr = 3/1) | 10 |
| Washcoat ratio target value | 15 wt. percent | | 15 wt. percent | |

Figure 4:
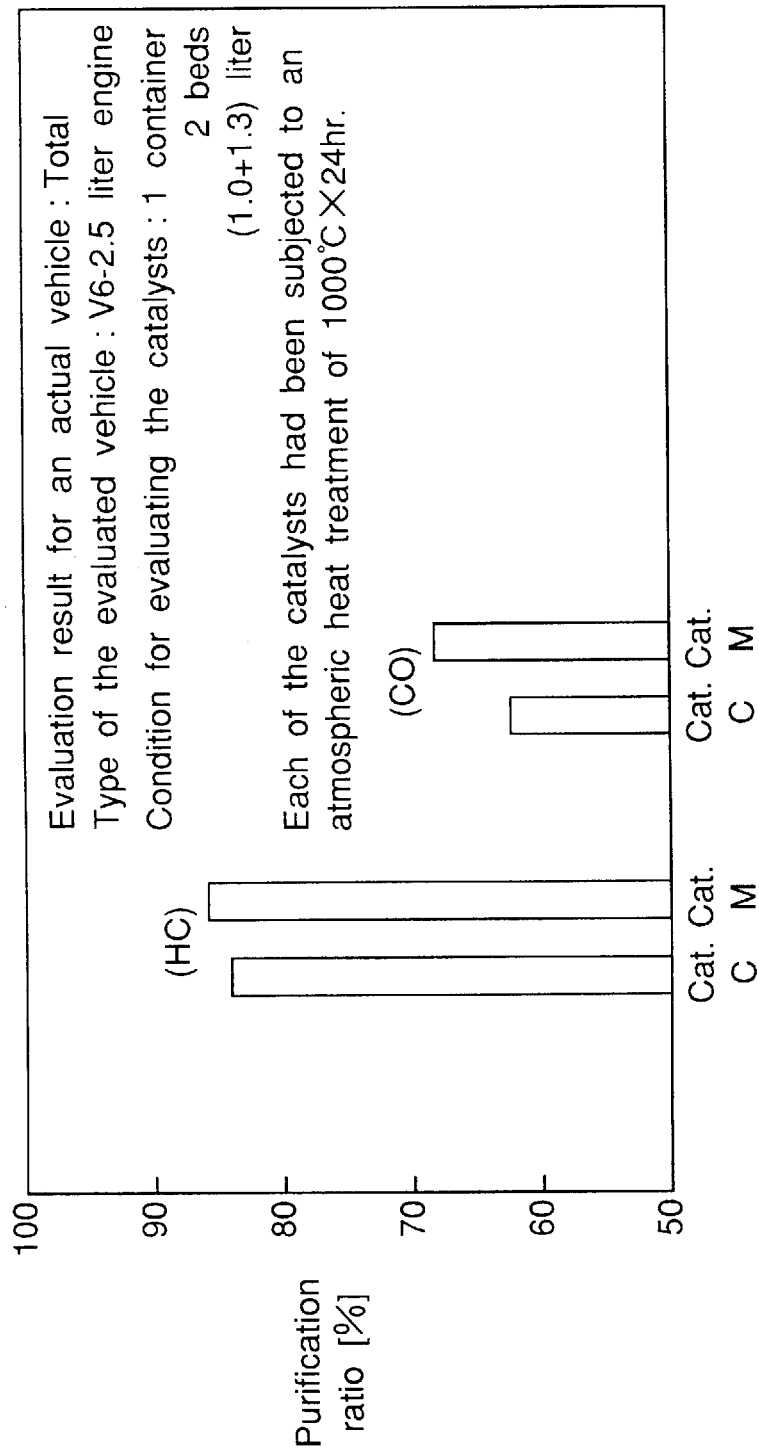
FIG. 4 is a histogram showing total purification ratio data of an exhaust gas purifying catalyst according to the present invention and a conventional exhaust gas purifying catalyst prepared for comparison.

In FIG. 4, there are shown total purification ratios (percent) of HC and CO as to the catalyst M and the catalyst C, each of which had been aged. Hereupon, the total purification ratio means the whole purification ratio during the period in which the engine is working. In this case, the aging was performed by exposing each of the catalysts in the air of 1000° C. for 24 hours. The other conditions for evaluating the catalysts are described in FIG. 4.

Figure 5:
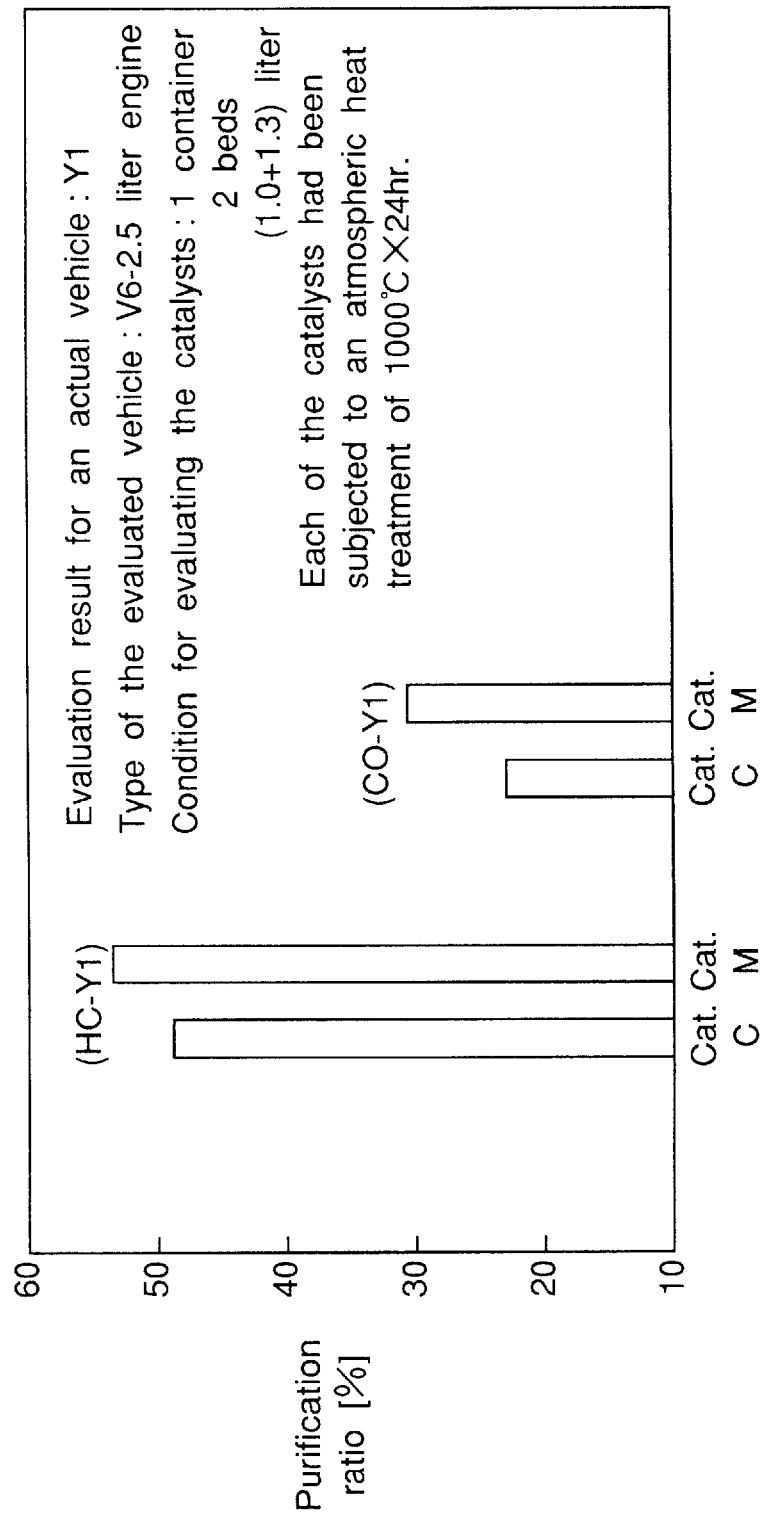
FIG. 5 is a histogram showing Y1 purification ratio data of an exhaust gas purifying catalyst according to the present invention and a conventional exhaust gas purifying catalyst prepared for comparison.

In FIG. 5, there are shown Y1 purification ratios (percent) of HC and CO as to the catalyst M and the catalyst C, each of which had been aged. Hereupon, Y1 purification ratio, which is stipulated in the FTP mode in the United States, means the purification ratio at early time after the engine has begun to work. In this case, the aging was performed by exposing each of the catalysts in the air of 1000° C. for 24 hours. The other conditions for evaluating the catalysts are described in FIG. 5.

Figure 6:
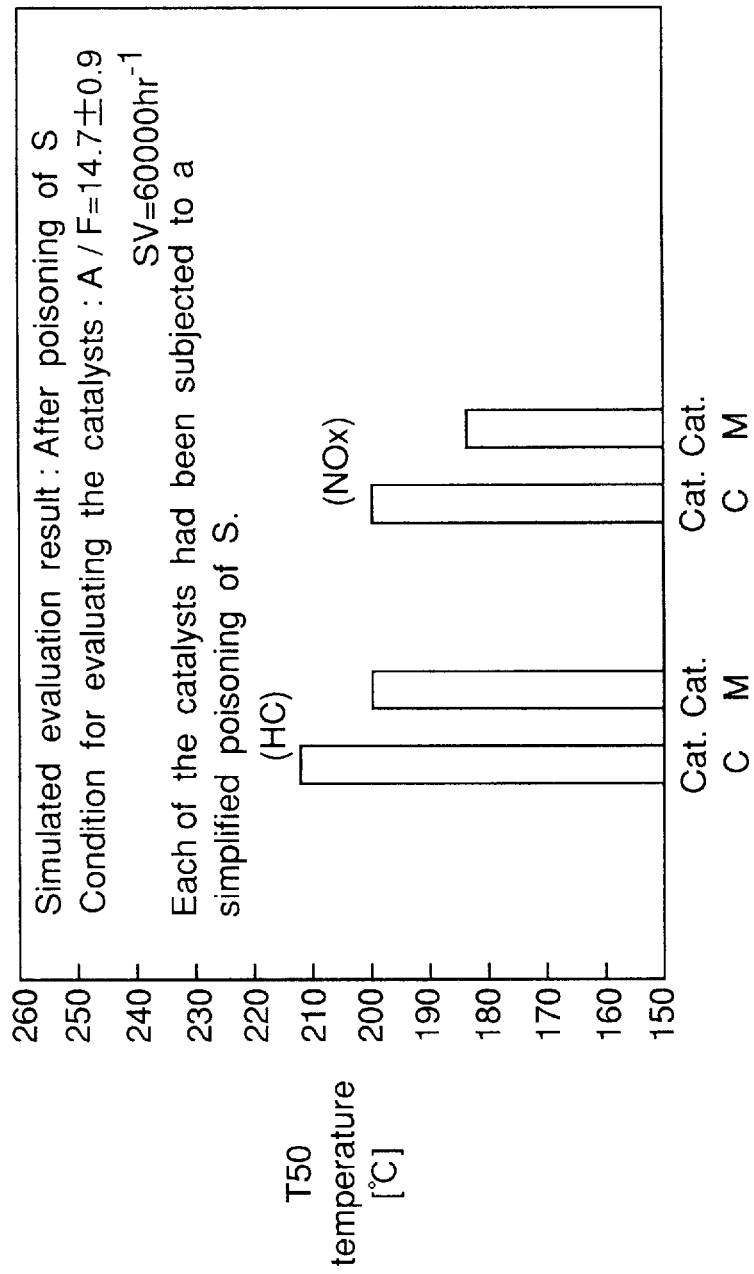
FIG. 6 is a histogram showing T50 temperature data of an exhaust gas purifying catalyst according to the present invention and a conventional exhaust gas purifying catalyst prepared for comparison, wherein each of the catalysts had been subjected to a simplified sulfuric poisoning treatment.

In FIG. 6, there are shown T50 temperatures (°C.) of HC and NOx as to the catalyst M and the catalyst C, each of which had been subjected to a simplified sulfuric poisoning treatment. In this case, the simplified sulfuric poisoning treatment was performed by exposing each of the catalysts in the circumstance of sulfur dioxide (SO$_2$) for a predetermined period. The other conditions for evaluating the catalysts are described in FIG. 6.

Figure 7:
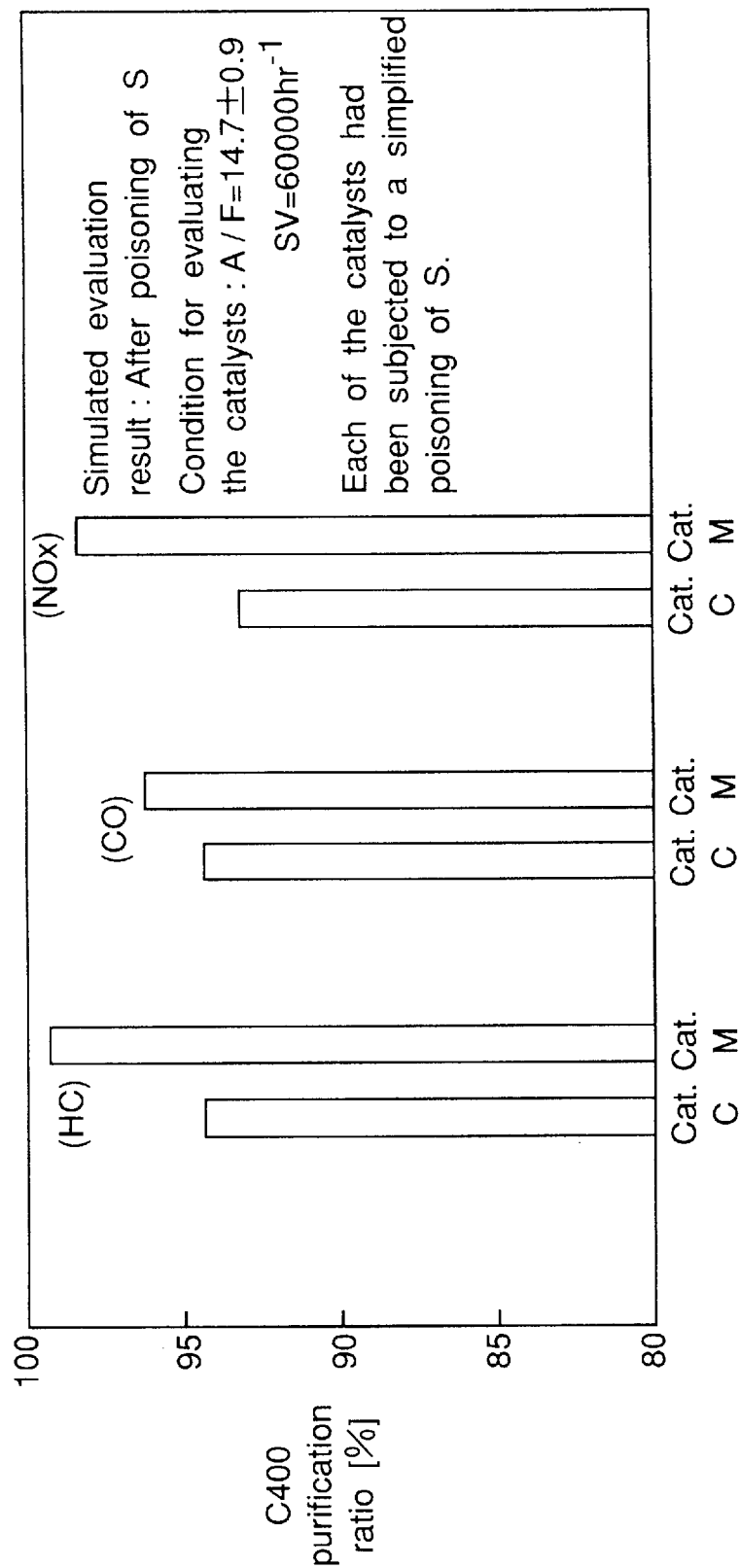
FIG. 7 is a histogram showing C400 purification ratio data of an exhaust gas purifying catalyst according to the present invention and a conventional exhaust gas purifying catalyst prepared for comparison, wherein each of the catalysts had been subjected to a simplified sulfuric poisoning treatment.

In FIG. 7, there are shown C400 purification ratios (percent) of HC, CO and NOx as to the catalyst M and the catalyst C, each of which had been subjected to a simplified sulfuric poisoning treatment. In this case, the simplified sulfuric poisoning treatment was performed by the same method as described in FIG. 6. The other conditions for evaluating the catalysts are described in FIG. 7.

Hereupon, C400 purification ratio (percent) means a purification ratio of the predetermined air pollutant (HC, CO and NOx in this case) measured at such a condition that the temperature of the inlet exhaust gas is 400° C. Namely, C400 purification ratio is an index for evaluating the exhaust gas purifying ability of the exhaust gas purifying catalyst at higher temperature condition, namely ordinary condition. Therefore, the higher C400 purification ratio of the exhaust gas purifying catalyst becomes, the higher the exhaust gas purifying ability of the catalyst at higher temperature condition or ordinary condition becomes.

As apparent from FIGS. 4 and 5, the catalyst M, which is a exhaust gas purifying catalyst according to the present invention, excels the catalyst C, which is a comparative example, in both of the total purification ratio and Y1 purification ratio of HC and CO, at such a state that each of the catalysts was not subjected to the simplified sulfuric poisoning treatment.

Further, as apparent from FIG. 6, the catalyst M has a lower T50 temperature of HC and NOx in comparison with the catalyst C which is a comparative example, at such a state that each of the catalysts was subjected to the simplified sulfuric poisoning treatment. Namely, the exhaust gas purifying ability of the catalyst M at a lower temperature condition is higher than that of the catalyst C. Therefore, it may be considered that the sulfuric poisoning of the catalyst M is prevented or the sulfuric poisoning of the catalyst M is at least slighter than that of the catalyst C. According to the above-mentioned fact, it may be considered that the poisoning of the palladium component is effectively restrained by the nickel oxide component.

Moreover, as apparent from FIG. 7, the catalyst M has a higher C400 purification ratio of HC, CO and NOx in comparison with the catalyst C which is a comparative example, at such a state that each of the catalysts was subjected to the simplified sulfuric poisoning treatment. Namely, the exhaust gas purifying ability of the catalyst M at a higher temperature condition or an ordinary condition is higher than that of the catalyst C. Therefore, it may be considered that the sulfuric poisoning of the catalyst M is prevented or the sulfuric poisoning of the catalyst M is at least slighter than that of the catalyst C. According to the above-mentioned fact, also, it may be considered that the poisoning of the palladium component is effectively restrained by the nickel oxide component.

Thus, according to the above-mentioned embodiments, the catalyst which has a higher exhaust gas purification ratio (particularly HC purification ratio) at both the condition of lower and higher (ordinary) temperature, and also is not poisoned by catalyst poisons such as sulfuric components and the like or at least is hardly poisoned.

Although, the present invention has been described in terms of preferred embodiments, it will be apparent to those of skill in the art that numerous variations and modifications may be made without departing from the true spirit and scope thereof, as set forth in the following claims.

What is claimed is:

1. A catalyst for purifying an exhaust gas, comprising:
   a carrier for carrying a plurality of catalytic layers;
   a first catalytic layer coating said carrier, said first catalytic layer comprising a first alumina component, a nickel oxide component and a palladium component; and
   a second catalytic layer disposed on said first catalytic layer, said second catalytic layer comprising a second alumina component and a rhodium component.

2. The catalyst recited in claim 1, wherein said nickel oxide component is composed of a nickel oxide powder, said palladium component being held by said nickel oxide powder.

3. The catalyst recited in claim 1, wherein a palladium content in said first catalytic layer is from 7 to 93 percent by weight relative to the nickel oxide component.

4. The catalyst recited in claim 3, wherein the palladium content in said first catalytic layer is from 14 to 47 percent by weight relative to the nickel oxide component.

5. The catalyst recited in claim wherein said first catalytic layer contains a ceria component and a zirconia component.

6. A catalyst for purifying an exhaust gas, comprising a carrier and a plurality of catalytic layers coating said carrier, wherein an inner catalytic layer comprises a palladium component, a nickel oxide component, a ceria component and a zirconia component, said ceria component and said zirconia component being combined so as to form an oxide complex.

7. The catalyst recited in claim 2, wherein a particle diameter of the nickel oxide powder in said first catalytic layer is from 0.5 to 12 μm.

8. The catalyst recited in claim 1, wherein a number of said catalytic layers is two.

9. The catalyst recited in claim 1, wherein said first and second alumina components are composed of alumina impregnated with lanthanum.

10. The catalyst of claim 1, wherein the palladium component and the rhodium component do not coexist in the same catalytic layer.

11. A catalyst for purifying an exhaust gas, comprising:
a carrier for carrying a plurality of catalytic layers;
an inner catalytic layer coating said carrier, said inner catalytic layer comprising a first base material, a nickel oxide component and a palladium component; and
an outer catalytic layer disposed on said inner catalytic layer, said outer catalytic layer comprising a second base material and a rhodium component.

12. The catalyst recited in claim 11, wherein said nickel oxide component is composed of a nickel oxide powder, and wherein said palladium component and said nickel oxide powder are supported in said first base material.

13. The catalyst recited in claim 11, wherein said inner catalytic layer has a palladium content of from 7 to 93 percent by weight relative to the nickel oxide component.

14. The catalyst recited in claim 11, wherein said inner catalytic layer has a palladium content of from 14 to 47 percent by weight relative to the nickel oxide component.

15. The catalyst recited in claim 11, wherein said inner catalytic layer comprises a ceria component and a zirconia component.

16. The catalyst recited in claim 12, wherein a particle diameter of the nickel oxide powder in said inner catalytic layer is from 0.5 to 12 μm.

17. The catalyst recited in claim 11, wherein said first base material and said second base material comprise alumina impregnated with lanthanum.

18. The catalyst recited in claim 11, wherein the palladium component and the rhodium component do not coexist in the same catalytic layer.

19. The catalyst recited in claim 11, wherein the base material in each of said catalytic layers supports the catalyst material.

20. A catalyst for purifying an exhaust gas, comprising:
a carrier for carrying a plurality of catalytic layers;
an inner catalytic layer coating said carrier, said inner catalytic layer comprising a first alumina component, a nickel oxide component and a palladium component supported by said first alumina component; and
an outer catalytic layer disposed on said inner catalytic layer, said outer catalytic layer comprising a second alumina component and a catalytic material supported by said second alumina component.

21. The catalyst recited in claim 20, wherein said outer catalytic layer contains a rhodium component as a catalytic material.

22. The catalyst recited in claim 20, wherein said nickel oxide component is composed of a nickel oxide powder whose particle diameter is from 0.5 to 12 μm, and wherein said palladium component and said nickel oxide powder are supported in said first alumina component.

* * * * *